United States Patent [19]

Takada et al.

[11] Patent Number: 4,973,520

[45] Date of Patent: Nov. 27, 1990

[54] OPTICAL RECORDING MEDIUM

[75] Inventors: Hirokazu Takada, Sakura; Sadaaki Shigeta, Narashino, both of Japan

[73] Assignee: Dainippon Ink and Chemicals Inc., Tokyo, Japan

[21] Appl. No.: 250,268

[22] Filed: Sep. 28, 1988

[30] Foreign Application Priority Data

Sep. 29, 1987 [JP] Japan ................................. 62-245241

[51] Int. Cl.$^5$ ............................................. B32B 27/36
[52] U.S. Cl. .................................... 428/412; 428/469; 369/288; 346/135.1
[58] Field of Search ...................... 369/288; 350/96.12, 350/316; 346/135.1, 1.1; 419/9, 10, 19; 428/646, 552, 647, 648, 633, 469, 412

[56] References Cited

U.S. PATENT DOCUMENTS

| | | | |
|---|---|---|---|
| 4,465,767 | 8/1984 | Oba et al. | 346/135.1 |
| 4,477,819 | 10/1984 | Lee et al. | 346/135.1 |
| 4,788,097 | 11/1988 | Ohara et al. | 428/201 |
| 4,816,840 | 3/1989 | Osato et al. | 346/1.1 |
| 4,816,841 | 3/1989 | Kobayashi et al. | 346/135.1 |

Primary Examiner—Stephen J. Lechert, Jr.
Assistant Examiner—Ngoclan T. Mai
Attorney, Agent, or Firm—Burns, Doane, Swecker & Mathis

[57] ABSTRACT

An optical recording medium is disclosed, which has a substrate and a recording film formed on the substrate. The recording film has a film comprising tin as the main component and passive state-forming metal layers formed on both sides of the tin film. The optical recording medium has a high recording sensitivity, a good signal quality and a high reliability. The optical recording medium is prepared by forming a first passive state-forming metal layer, a film comprising tin as the main component and a second passive state-forming metal layer in sequence on a substrate, and preferably heating the thus-obtained laminate.

8 Claims, 4 Drawing Sheets

OPTICAL RECORDING MEDIUM

BACKGROUND OF THE INVENTION (1) Field of the Invention

The present invention relates to an optical recording medium comprising a recording film of a metal formed on a substrate. In this optical recording medium, the metal film is irradiated with laser beams to melt or evaporate the film and form small pits or cause deformation, whereby information can be recorded at a high density, and reproduction is performed by utilizing changes in the light reflectance or transmission in the recorded areas.

(2) Description of the Related Art

A process is known in which laser beams are converged on a recording film formed on a disk-shaped transparent substrate of a glass or plastic material and a physical deformation, a phase change or the like occurs in the laser beam-converged portion of the recording film, and information is recorded by utilizing this deformation or change. If a high output laser such as an argon laser is used as the laser beam source for recording, a film of a high-melting-point metal having a high oxidation resistance can be used as the recording film, and the range of selection of the recording film is expanded. But the size of the recording and reproducing apparatus, per se, is increased and an expensive modulator must be provided for modulation of the laser beams, and thus this process is not suitable for practical application. Accordingly, semiconductor lasers are mainly used at present, but semiconductor lasers have problems in that the wavelength of laser beam is limited to that in the near-infrared region and the output is low. Accordingly, a recording medium of a heat mode optical recording medium used for recording information according to the above-mentioned process must have a high absorption to light in the near-infrared region.

The heat mode optical recording medium most frequently used at present is the type wherein pits are formed in a laser beam-converged portion and information is recorded by utilizing these pits. In order for this optical recording medium to show good recording characteristics, the material of the recording film must have a low melting point, the material must have a low heat conductivity, the material must have an appropriate light reflectance, and pits having a good shape must be formed. As the conventional material of the optical recording film satisfying these requirements, there are known films prepared by vacuum deposition or sputtering of metals such as tellurium, bismuth, selenium and tin, alloys composed mainly of these metals and composites of these metals or alloys with organic materials or oxides, and films formed by spin-coating of organic dyes having a light absorption band in the near-infrared region.

Especially, a film of tin formed by vacuum deposition or sputtering has a low melting point and high light absorption and reflectance in the near-infrared region, and therefore, a recording film of the pit-forming type having a high recording sensitivity and a high contrast ratio can be obtained from tin. Moreover, this recording film is advantageous over other metal type optical recording materials in that the material is cheap and has a low toxicity.

Although the tin film has the above-mentioned characteristics, a film of tin formed by vacuum deposition or sputtering has a cohesion structure and the surface is roughened, and therefore, if recording and reproduction are carried out on this recording film, the noise due to the surface condition of the film is large and a good C/N ratio cannot be obtained. Moreover, the tin film is often deteriorated by oxidation, and if the tin film is allowed to stand in air for a long time, a reduction of the reflectance and a formation of pinholes occur.

As the means for obviating the foregoing defects without degradation of the high sensitivity possessed by the tin film, there can be mentioned a method in which another metal is added to tin, a method in which a compound of tin is used, and a method in which fine particles of tin are dispersed in a tin compound. Since films prepared according to these methods, which comprise tin as the main component, are composed of fine particles of tin, the above-mentioned noise due to the surface condition of the film is drastically reduced. Furthermore, according to these methods, the oxidation resistance of the film is increased, and reduction of the reflectance of the recording film or degradation of the recording-reproducing characteristics, caused when the film is stored at room temperature for a long time, can be controlled to a high degree.

As the substrate acting as a support for the recording film, a glass substrate, a plastic substrate composed of polymethyl methacrylate, polycarbonate, an epoxy resin or the like, and a substrate which is formed by coating a recording film-forming side of a substrate as mentioned above with an ultraviolet ray-curable resin or the like for formation of a guide groove or the like, are often used.

Especially, the plastic substrate is frequently used because the molding is easily performed, little cracking occurs handling is easy, and the heat conductivity is low.

If the above-mentioned film comprising tin as the main component is allowed to stand in a high-temperature and high-humidity atmosphere for a long time, because of an adhesion of water drops or other foreign substances, pinholes are formed by pitting and the bit error rate is increased, with the result that a problem arises with respect to the reliability of the medium.

Moreover, if this film comprising tin as the main component is formed on a plastic substrate such as polymethyl methacrylate or polycarbonate and recording is conducted on this recording medium, the formation of pits is incomplete and the film material is not completely removed from the laser beam-irradiated area but a slight amount thereby remains in the interiors of pits, as shown in FIG. 2. Therefore, the C/N ratio upon reproduction is unsatisfactory and the bit error rate is high.

SUMMARY OF THE INVENTION

A primary object of the present invention is to overcome the foregoing defects and provide an optical recording medium having a high recording sensitivity, a good signal quality and a high reliability.

In accordance with the present invention, there is provided an optical recording medium comprising a substrate and a recording film formed on the substrate, said recording film having a film comprising tin as the main component and passive state-forming metal layers formed on both the sides of the tin film.

DETAILED DESCRIPTION OF THE PREFERRED EMBODIMENTS

Figure 1:
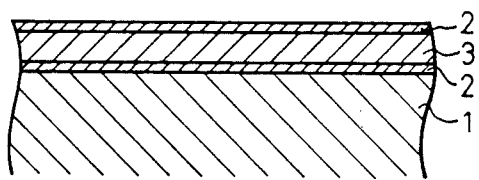
FIG. 1 is a sectional view illustrating the layer structure of the optical recording medium of the present invention.

The optical recording medium of the present invention has a layer structure as shown in FIG. 1. More specifically, a recording film comprising a film 3 having tin as the main component and passive state-forming metal layers 2 on both the sides of the film 3 is formed on a substrate 1. The passive state-forming metal layer 2 in the recording medium of the present invention forms a stable oxide coating, that is, a passive state coating, on the surface brought into contact with air or the substrate, and further the surface of the passive state-forming metal layer is rendered passive by the action of oxygen in air or oxygen permeating through the substrate. Since the surface of the metal layer 2 is rendered passive, the layer 2 comprising tin as the main component is protected from oxidation, and accordingly, even if the optical recording medium of the present invention is allowed to stand in a high-temperature and high-humidity atmosphere for a long time, any reduction of the recording sensitivity and the C/N ratio and increase of the error rate by pitting, are greatly moderated and the reliability thereof as a recording medium is much improved.

A metal capable of forming a stable oxide passive state by standing at room temperature in an oxygen-containing atmosphere such as air or by a heat treatment or wet heat treatment in an oxygen-containing atmosphere is used as the metal for the passive-state-forming metal layer in the present invention. For example, there can be mentioned Al, Ti, Cr, Co, Ni, Nb, Ta and Zr.

Figure 2:
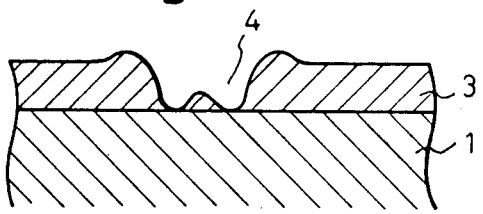
FIG. 2 is a sectional view showing the shape of recording pits in a recording film (prior art) composed solely of a film comprising tin as the main component.
Figure 3:
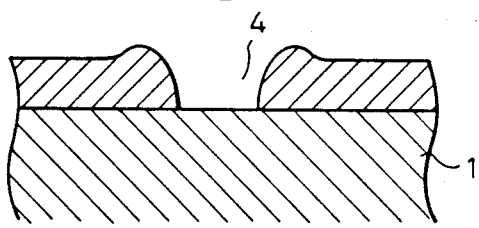
FIG. 3 is a sectional view showing the shape of recording pits in the recording film of the present invention.

Among these metals, Ti and Cr are capable of forming a strong passive state layer having a much reduced number of defects even in the case of a thin film, and furthermore, if a film comprising a layer of Ti or Cr laminated on a layer comprising tin as the main component is formed on a plastic substrate such as polymethyl methacrylate or polycarbonate, pits 4 having a good shape as shown in FIG. 3 are formed by irradiation with laser beams, and therefore, the C/N ratio can be improved and the bit error rate can be reduced. In the case of a conventional recording medium composed solely of a layer 2 comprising tin as the main component, the film material 3 is not completely removed, as shown in FIG. 2, by irradiation with laser beams, and the film material is often left in the interiors of pits. The reason why a good shape is given to pits by lamination of the layer of Ti or Cr is that the affinity of the melt of the layer comprising tin as the main component, formed at the recording, with the substrate is reduced by the addition of Ti or Cr.

In the optical recording medium of the present invention, the passive state-forming metal layers must be formed on both surfaces of the layer comprising tin as the main component. When this passive state-forming metal layer is formed only on the front surface of the layer comprising tin as the main component or on the interface between this layer and the substrate, an effect of imparting a good shape to pits can be obtained, but in this case, under high-temperature and high-humidity conditions or under severe environmental conditions where dewing or an adhesion of foreign substances occurs, oxidation of the layer comprising tin as the main component is apt to advance from the side where the passive state-forming metal layer is not formed, and especially, when a plastic substrate having a high water permeability is used, the problem of a lowering of the reliability arises.

In the present invention, preferably the thickness of each of the passive state-forming metal layers is 5 to 40 A. Since the passive state-forming metal has a higher melting point and a higher heat conductivity than those of the constituent material of the layer comprising tin as the main component, if the thickness of the passive state-forming metal layer exceeds 40 A, a much larger laser output becomes necessary for the formation of pits. Namely, the recording sensitivity is reduced, and therefore, a too large a thickness is not preferred. In contrast, if the thickness of the passive state-forming metal layer is less than 5 A, the above-mentioned effect of the present invention cannot be obtained.

As the constituent material of the layer comprising tin as the main component, there can be mentioned materials comprising 40 to 80 atom % of tin, which include alloys of metals or submetals such as Se, Bi and Sb with Sn; tin compounds such as stannous sulfide and stannous selenide; and materials formed by dispersing fine particles of tin in at least one member selected from tin oxides, tin sulfides and tin selenides.

Preferably the content of Sn in the layer comprising tin as the main component is 40 to 70 atom %. If the Sn content is larger than 80 atom %, the recording sensitivity or C/N ratio is reduced and no good results can be obtained. Preferably the thickness of the layer comprising tin as the main component is 50 to 300 Å. If the thickness is within this range, a recording film having good recording and reproducing characteristics can be obtained.

If Ti is used as the passive state-forming metal and $Sn_xSe_{100-x}$ (in which x is a number in the range of $0 < x < 100$) is used as the constituent material of the layer comprising tin as the main component, a recording film having especially good recording characteristics can be obtained. Namely, since the film composed of $Sn_xSe_{100-x}$ has a relatively large light absorption, the sensitivity is high, and since the grain size is very fine, a recording film having a small medium noise can be obtained. Moreover, since Ti and an oxide thereof have a high effect of increasing the viscosity of the melt of the $Sn_xSe_{100-x}$, the formed pits have a very good shape, and therefore, a recording film having good recording characteristics such as a high C/N ratio and a low error rate can be obtained. Note, in the composition of $Sn_xSe_{100-x}$, if the proportion of Se is too high, the light absorption is reduced to reduce the recording sensitivity, and if the proportion of Se is too low, the shape of the pits is degraded to reduce the C/N ratio. Accordingly, preferably the value of x in $Sn_xSe_{100-x}$ is in the range of from 40 to 70.

Any transparent substrate customarily used for optical recording media, for example, a glass substrate, a substrate composed of a thermoplastic resin such as polymethyl methacrylate or polycarbonate, a substrate composed of a thermosetting resin such as an epoxy resin, and a substrate formed by coating a recording film-forming side of a substrate as mentioned above with an ultraviolet ray-curable resin for formation of a groove or the like, can be used as the substrate in the present invention. An organic material is generally characterized in that the heat conductivity is lower than that of glass or the like, and therefore, where an optical recording medium having an especially high sensitivity is required preferably a plastic substrate or a glass substrate having a covering film or coating of an appropriate organic material formed on the surface contiguous to the recording film is used as the substrate.

The recording film of the recording medium of the present invention is prepared by forming the respective layers by the physical film-forming method or chemical film-forming method such as the vacuum deposition method or the sputtering method. To prevent oxidation of the interface portions of the respective layers, preferably a method is adopted in which, after a formation of one layer, a subsequent layer is formed without exposing the surface of the formed layer to an oxygen-containing atmosphere such as air. More specifically, preferably the respective layers are continuously prepared while maintaining a vacuum in a vacuum tank.

After the optical recording film is formed on the substrate, the obtained optical recording medium may be immediately used. But, to produce a stable and firm passive state in the passive state-forming metal layer, preferably the obtained optical recording medium is subjected to an appropriate heat treatment. Even where the recording laser output is large, expansion of the pit shape and degradation of the pit shape can be controlled by the heat treatment and pits having a uniform peripheral shape and obtained, and therefore, a high C/N ratio and a low error rate can be maintained stably over a broad range of the recording laser output, and a recording medium capable of providing a stable tracking servo can be obtained.

The reason why a recording medium having good characteristics is obtained by the heat treatment is considered to be as follows. When the recording film comprising the film having Sn as the main component and the passive state-forming metal films formed on both surfaces of the tin-containing film is heated in air, a very thin film composed of oxides of the passive state-forming metal present on the surface and the constituent material of the film comprising Sn as the main component is formed. This oxide layer exerts the function of arranging the pit shape at the time of formation of pits, and even if the laser energy applied to the recording film for recording becomes excessive, reduction of the C/N ratio is remarkably moderated, and the influence on the tracking servo system of the formed pits is considerably reduced. These advantages are obtained because the oxide layer has a melting point higher than that of the layer comprising Sn as the main component, and because the viscosity of the melt of the recording film at the time of a formation of pits is increased by an incorporation of the oxide. Moreover, since the oxide layer formed by heating in the air is dense, an intrusion of oxygen in the air into the interior of the recording medium is prevented and the oxide layer effectively protects the recording film from oxidation. Therefore, an optical recording medium having a high storage stability can be obtained.

The heat treatment may be accomplished by heating the optical recording medium comprising the recording film formed on the substrate at a temperature of 50 to 120° C. in the open air. If the heating temperature is lower then 50° C., the heating time should be considerably prolonged to obtain the above-mentioned effects. In view of the use of a plastic substrate and to prevent a formation of cracks in the recording film, preferably the heating temperature does not exceed 120° C., and preferably the heating is conducted for about 1 to about 5 hours.

The advantages obtained by the recording medium of the present invention are summarized below. The defects of the conventional film comprising tin as the main component, for example, a reduction of the C/N ratio due to a bad shape of pits and an increase of the bit error rate due to a formation of pinholes at the accelerated deterioration test, can be overcome, and an optical recording medium having a good performance can be obtained.

Furthermore, since tin is used as the main constituent element in the recording medium of the present invention, the recording medium of the present invention has a much lower toxicity than the conventional recording media comprising tellurium or the like, and does not cause environmental pollution.

Especially, if the heat treatment is carried out after formation of the recording film, recording can be stably performed at a high C/N ratio and a low error rate over a broad laser output range, and an effect of stabilizing the tracking servo in a recording and reproducing apparatus is realized. The optical recording medium can be used for various recording and reproducing apparatuses having different laser outputs, and moreover, the optical recording medium has an excellent storage stability and a high reliability.

The present invention will now be described in detail with reference to the following examples.

In the examples, the C/N ratio and bit error rate were determined as follows.

The C/N ratio is determined by recording a signal having a certain frequency on a disk, reproducing the signal and measuring the signal reproduced by using a spectrum analyzer. The C/N ratio is the ratio of the carrier level to the noise level at the stated frequency.

The bit error rate is determined by recording a signal having a certain frequency in the binary rotation scale and reproducing the signal. The bit error rate (E) is the ratio of the number (n) of bits erroneously reproduced to the total number (N) of bits recorded.

$$E = n/N$$

EXAMPLE 1

A disk-shaped substrate composed of a polycarbonate resin, which has a thickness of 1.2 mm and an outer diameter of 130 mm and had spiral grooves formed at pitches of 1.6 tm thereof, was placed in a vacuum tank of a sputtering apparatus, and the interior of the vacuum tank was evacuated. After the vacuum degree reached $2 \times 10^{-4}$ Pa, Ar gas was introduced to 0.5 Pa and a Ti film having a thickness of 25 angstroms was first formed by the DC magnetron sputtering method. Then, a film of $Sn_{65}Se_{35}$ having a thickness of 170 angstroms was formed on the Ti film by the RF magnetron sputtering method using an $Sn_{65}Se_{35}$ alloy target, and a Ti film having a thickness of 25 angstroms was formed on the alloy film in the same manner as described above. The disk-shaped substrate having the recording film thus formed thereon was placed in an oven and heat-treated at 75° C. for 4 hours.

The thus-obtained optical recording medium was placed in a recording and reproducing apparatus, and recording was carried out at a recording laser power of 6 mW, a recording frequency of 3.7 MHz, and a disk rotation of 1,800 rpm, by a semiconductor laser having a wavelength of 830 nm. When reproduction was performed at a reproduction laser power of 1 mW, a C/N ratio of 58 dB was obtained. When the bit error rate was measured under this condition, it was found that the bit error rate was $8.0 \times 10^{-6}$.

Figure 4:
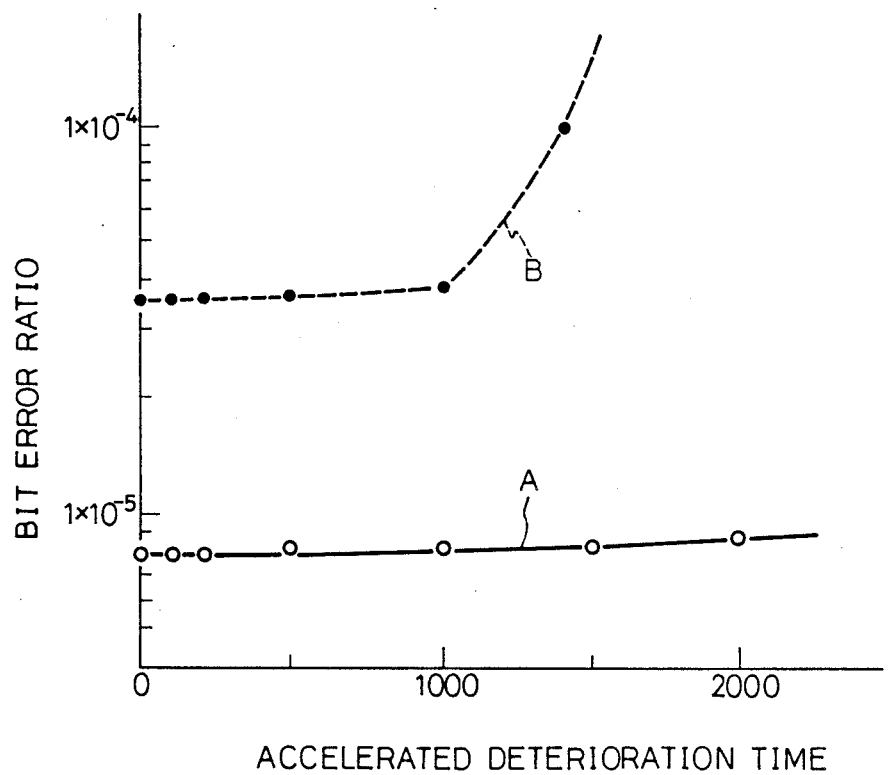
FIG. 4 is a graph illustrating the relationship between the accelerated deterioration test time and the bit error rate, with respect to the optical recording media obtained in Example 1 and Comparative Example 1.

The above-mentioned optical recording medium was placed in a constant-temperature constant-humidity vessel maintained at a temperature of 75° C. and a relative humidity of 85%, and the accelerated deterioration test was carried out for 2,000 hours. It was found that no change such as a formation of pinholes occurred. When this optical recording medium was subjected to recording and reproduction according to the same procedures as described above, it was found that the C/N ratio was 58 dB and the bit error rate was $8.7 \times 10^{-6}$. Namely, no substantial change was observed. The relationship between the accelerated deterioration test time and the bit error rate is shown in FIG. 4A.

EXAMPLES 2 to 8 AND COMPARATIVE EXAMPLES 1 to 5

The same polycarbonate substrate as described in Example 1 was arranged in a sputtering apparatus or vacuum deposition apparatus, and the interior of the apparatus was evacuated to adjust the vacuum degree to $2 \times 10^{-4}$ Pa. Then, a layer of a passive state-forming metal, a layer comprising tin as the main component, and a layer of a passive state-forming metal were formed in succession to form an optical recording medium having a layer structure shown in Table 1. Note, where the layer comprising tin as the main component was formed by the binary simultaneous vacuum deposition method or binary simultaneous sputtering method, the deposition speeds of the respective components were controlled by controlling the electric power supplied to two vacuum deposition crucibles or sputtering targets, whereby the compositions of the films were controlled.

For comparison, optical recording media not having a passive state-forming metal layer (Comparative Example 1), having a passive state-forming metal layer on only one surface of the layer comprising tin as the main component (Comparative Examples 2 and 3), or having a recording film including a tin-containing layer in which the amount of tin contained was not appropriate (Comparative Examples 4 and 5) were prepared.

These recording media were subjected to recording and reproduction according to the same procedures as described in Example 1. Then, the optical recording media were placed in a constant-temperature constant-humidity vessel maintained at a temperature of 75° C. and a relative humidity of 85%, and the accelerated deterioration test was carried out for 2,000 hours. Recording and reproduction tests were then conducted again according to the same procedures as described above, and the results of these tests, as well as the experimental results obtained in Example 1, are shown in Table 1. Furthermore, the relationship between the accelerated deterioration test time and the bit error rate, observed in Comparative Example 1, is shown in FIG. 4A.

TABLE 1

| | Layer of structure of recording film and film-forming method | | | Recording and reproducing characteristics | | | |
|---|---|---|---|---|---|---|---|
| | Passive state-forming metal layer | | | Before accelerated deterioration test | | After accelerated deterioration test | |
| | Substrate side (thickness, A) | Side opposite to substrate (thickness, A) | Layer comprising Sn as main component (thickness, A) | CN ratio (dB) | bit error rate | CN ratio (dB) | Bit error rate |
| Example 1 | Ti sputtering (25) | Ti sputtering (25) | SnSe sputtering (170) | 58 | $8.0 \times 10^{-6}$ | 58 | $8.7 \times 10^{-6}$ |
| Example 2 | Ti sputtering (10) | Ti sputtering (10) | SnSe sputtering (170) | 54 | $8.1 \times 10^{-6}$ | 53 | $9.2 \times 10^{-6}$ |
| Example 3 | Ti sputtering (50) | Ti sputtering (50) | SnSe sputtering (170) | 51 | $8.5 \times 10^{-6}$ | 51 | $8.8 \times 10^{-6}$ |
| Comparative Example 1 | Not formed | Not formed | SnSe sputtering (170) | 45 | $2.5 \times 10^{-5}$ | 44 | $3.7 \times 10^{-3}$ |
| Comparative Example 2 | Ti sputtering (25) | Not formed | SnSe sputtering (170) | 50 | $1.1 \times 10^{-5}$ | 46 | $8.1 \times 10^{-4}$ |
| Comparative Example 3 | Not formed | Ti sputtering (25) | SnSe sputtering (170) | 53 | $1.0 \times 10^{-5}$ | 46 | $1.1 \times 10^{-3}$ |
| Example 4 | Ti sputtering (5) | Ti sputtering (5) | SnSe sputtering (170) | 52 | $1.5 \times 10^{-5}$ | 52 | $1.7 \times 10^{-5}$ |
| Example 5 | Ti sputtering (25) | Ti sputtering (25) | Sn—SnSe simultaneous sputtering (Sn:70 atomic %) (170) | 54 | $9.1 \times 10^{-6}$ | 54 | $9.2 \times 10^{-6}$ |
| Comparative Example 4 | Ti sputtering (25) | Ti sputtering (25) | Sn—Se simultaneous sputtering (Sn:20 atomic %) (170) | 38 | $4.3 \times 10^{-4}$ | 36 | $5.1 \times 10^{-4}$ |
| Comparative Example 5 | Ti sputtering (25) | Ti sputtering (25) | Sn—SnSe simultaneous sputtering (Sn:90 atomic %) (170) | 42 | $1.8 \times 10^{-5}$ | 38 | $2.2 \times 10^{-4}$ |
| Example 6 | Ti vacuum deposition (25) | Ti vacuum deposition (25) | Sn—SnO$_2$ simultaneous sputtering (Sn:60 atomic %) (170) | 54 | $1.0 \times 10^{-5}$ | 54 | $1.3 \times 10^{-5}$ |
| Example 7 | Ti vacuum | Ti vacuum | SnS vacuum deposition | 51 | $2.0 \times 10^{-5}$ | 51 | $2.0 \times 10^{-5}$ |

TABLE 1-continued

| | Layer of structure of recording film and film-forming method | | | Recording and reproducing characteristics | | | |
|---|---|---|---|---|---|---|---|
| | Passive state-forming metal layer | | | Before accelerated deterioration test | | After accelerated deterioration test | |
| | Substrate side (thickness, A) | Side opposite to substrate (thickness, A) | Layer comprising Sn as main component (thickness, A) | CN ratio (dB) | bit error rate | CN ratio (dB) | Bit error rate |
| Example 8 | deposition (25) Cr vacuum deposition (25) | deposition (25) Cr vacuum deposition (25) | (120) Sn—Se simultaneous vacuum deposition (Sn:50 atomic %) (140) | 51 | $1.1 \times 10^{-5}$ | 51 | $1.2 \times 10^{-5}$ |

From the foregoing results, it can be understood that, if the structure comprising passive state-forming metal layers formed on both sides of a film comprising tin as the main component was adopted, an increase of the bit error rate could be properly controlled at the accelerated deterioration test.

EXAMPLE 9

The same disk-shaped substrate as used in Example 1 was arranged in a vacuum tank of a sputtering apparatus, and the interior of the vacuum tank was evacuated until the pressure was reduced below $1.33 \times 10^{-4}$ Pa. Then, Ar gas was introduced into the vacuum tank. The flow rate of Ar gas was controlled so that the pressure was about $6.7 \times 10^{-1}$ Pa. In this state, a Ti film having a thickness of 15 angstroms was formed on the substrate according to the DC magnetron sputtering method. Subsequently, a film of $Sn_{65}Se_{35}$ having a thickness of 150 angstroms was formed on the Ti film according to the RF magnetron sputtering method using a target of an $Sn_{65}Se_{35}$ alloy. Then, a Ti film having a thickness of 15 angstroms was formed on the $Sn_{65}Se_{35}$ film. The disk-shaped substrate having the recording film thus formed thereon was heat-treated at 75° C. for 4 hours in an oven.

Figure 5:
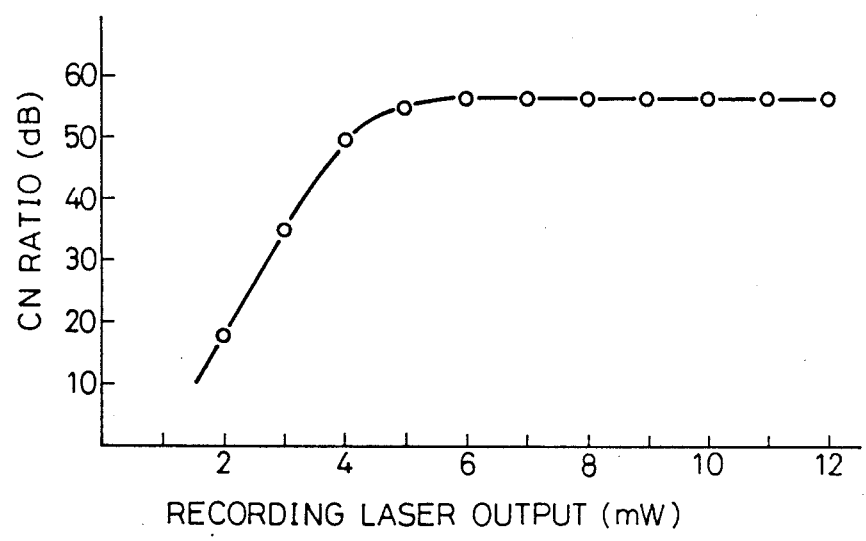
FIGS. 5 and 6 are graphs showing the relationship between the recording laser output and the C/N ratio, with respect to optical recording media obtained in Example 9.

The thus-obtained optical recording medium was placed in a recording and reproducing apparatus, and recording was carried out at a disk rotation of 1,800 rpm and a frequency of 3.7 MHz by a semiconductor laser having a wavelength of 830 nm while changing the laser output and reproduction was carried out at a laser output of 1 mW. The results are shown in FIG. 5. From the results shown in FIG. 5, it is seen that a high C/N ratio exceeding 55 dB was obtained over a broad recording laser output range exceeding 5 mW. Furthermore, the bit error rate was lower than $1 \times 10^{-5}$ at a recording laser output higher than 5 mW.

For comparison, a recording film was prepared in the same manner as described above except that after formation of the recording film, the heat treatment was not carried out.

Figure 6:
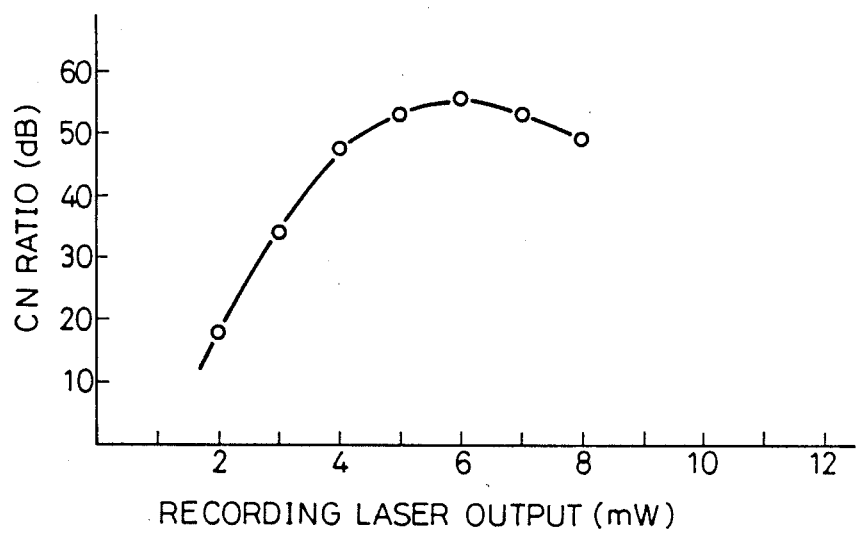

The obtained optical recording medium was subjected to the recording and reproduction tests according to the same procedures as described above the results are shown in FIG. 6. From the results shown in FIG. 6, it is seen that, although a high C/N ratio of 56 dB was obtained at a recording laser output of 6 mW, if the recording laser output was further increased, the C/N ratio gradually dropped. If the recording laser output exceeded 8 mW, the tracking servo became unstable during the reproduction and thus reproduction became impossible, and when the recorded area was observed by a microscope, a line of pits having a broadened diameter and irregular peripheral shapes was found.

EXAMPLES 10 THROUGH 13 AND COMPARATIVE EXAMPLE 6

In the same manner as described in Example 9, a Ti layer, an Sn/Se alloy layer and a Ti layer were formed in sequence on the same polycarbonate substrate as used in Example 9 to form a recording film. The composition of the Sn/Se alloy layer was $Sn_{65}Se_{35}$ and the thickness was adjusted to 150 angstroms, but the thickness of the Ti layers on both sides of the alloy layer was changed as shown in Table 2. The disk-shaped substrate having this recording film formed thereon was placed in an oven and heat-treated at 75° C. for 4 hours.

The thus-obtained optical recording medium was subjected to the recording and reproducing tests according to the same procedures as described in Example 9. The results are shown in Table 2. From the results shown in Table 2, it is understood that, if the thickness of the Ti layer was in the range of from 5 to 40 A, a recording medium having a high sensitivity and showing a high C/N ratio over a broad recording laser output range was obtained.

Table 2

| | Thickness of Ti layer (A) | Minimum laser output necessary for formation of pits (mW) | Maximum C/N ratio (dB) | Range of recording laser ouput (mW) providing C/N ratio of at least 50 dB |
|---|---|---|---|---|
| Comparative Example 6 | 0 | 3.5 | 45 | |
| Example 10 | 10 | 3.6 | 54 | ≧4.0 |
| Example 11 | 20 | 3.9 | 56 | ≧4.2 |
| Example 12 | 30 | 4.0 | 53 | ≧4.5 |
| Example 13 | 60 | 6.0 | 51 | 6.5–9.0 |

EXAMPLES 14 TO 16 AND COMPARATIVE EXAMPLES 7 AND 8

In the same manner as described in Example 9, a Ti layer, an Sn/Se alloy layer and a Ti layer were formed in sequence on the same polycarbonate substrate as used in Example 9 to form a recording film. The thicknesses of the respective layers were the same as described in Example 9, but the composition of the Sn/Se alloy layer, that is, the value of x in $Sn_xSe_{100-x}$, was changed as shown in Table 3. The disk-shaped substrate having the recording film formed thereon was placed in an oven and heat-treated at 75° C. for 4 hours.

The thus-obtained optical recording medium was subjected to the recording and reproducing tests according to the same procedures as described in Example 9. The results are shown in Table 3. From the results shown in Table 3, it is understood that, if the value of x in $Sn_xSe_{100-x}$ was in the range of from 40 to 70, an optical recording medium having a high sensitivity and showing a high C/N ratio over a broad recording laser output range was obtained.

TABLE 3

| | Value of x | Minimum laser output necessary for formation of pits (mW) | Maximum C/N ratio (dB) | Range of recording laser output (mW) providing C/N ratio of at least 50 dB |
|---|---|---|---|---|
| Comparative Example 7 | 30 | 6.5 | 51 | 7.0–8.0 |
| Example 14 | 45 | 4.2 | 55 | ≧4.8 |
| Example 15 | 50 | 3.8 | 54 | ≧4.3 |
| Example 16 | 60 | 3.9 | 55 | ≧4.3 |
| Comparative Example 8 | 90 | 4.2 | 40 | — |

We claim:

1. An optical recording medium comprising a substrate and a recording film formed on the substrate, said recording film having a film comprising tin as the main component and passivate state metal oxide layers formed on both sides of the tin film, each passive state metal oxide layer having a thickness of 5 to 40 angstroms.

2. An optical recording medium as set forth in claim 1, wherein the film comprising tin as the main component is composed of stannous sulfide or stannous selenide.

3. An optical recording medium as set forth in claim 1, wherein the film comprising tin as the main component is formed by dispersing fine particles of tin in at least one member selected from the group consisting of oxides, sulfides and selenides of tin.

4. An optical recording medium as set forth in claim 1, wherein the film comprising tin as the main component is composed of a tin selenide represented by the formula of $Sn_xSe_{100-x}$ in which x is a number of from 40 to 70.

5. An optical recording medium as set forth in claim 1, wherein the thickness of the film comprising tin as the main component is 50 to 300 angstroms.

6. An optical recording medium as set forth in claim 1, wherein the passive state metal oxide layers are formed from a passive state-forming metal selected from the group consisting of Al, Ti, Cr, Co, Ni, Nb, Ta and Zr.

7. An optical recording medium as set forth in claim 1, wherein the passive state metal oxide layers are formed from Ti or Cr.

8. An optical recording medium as set forth in claim 4, wherein the passive state metal oxide layers are formed from Ti.

* * * * *